March 25, 1924. 1,487,751
R. R. MILLER
CRAWLER TYPE TRACK LAYING TREAD ATTACHMENT FOR AUTOMOTIVE VEHICLES
Filed April 11, 1921  4 Sheets-Sheet 1

March 25, 1924.

R. R. MILLER 1,487,751

CRAWLER TYPE TRACK LAYING TREAD ATTACHMENT FOR AUTOMOTIVE VEHICLES

Filed April 11, 1921    4 Sheets-Sheet 3

FIG. 3

Witnesses

Inventor
ROYAL R. MILLER
by ............ Atty.

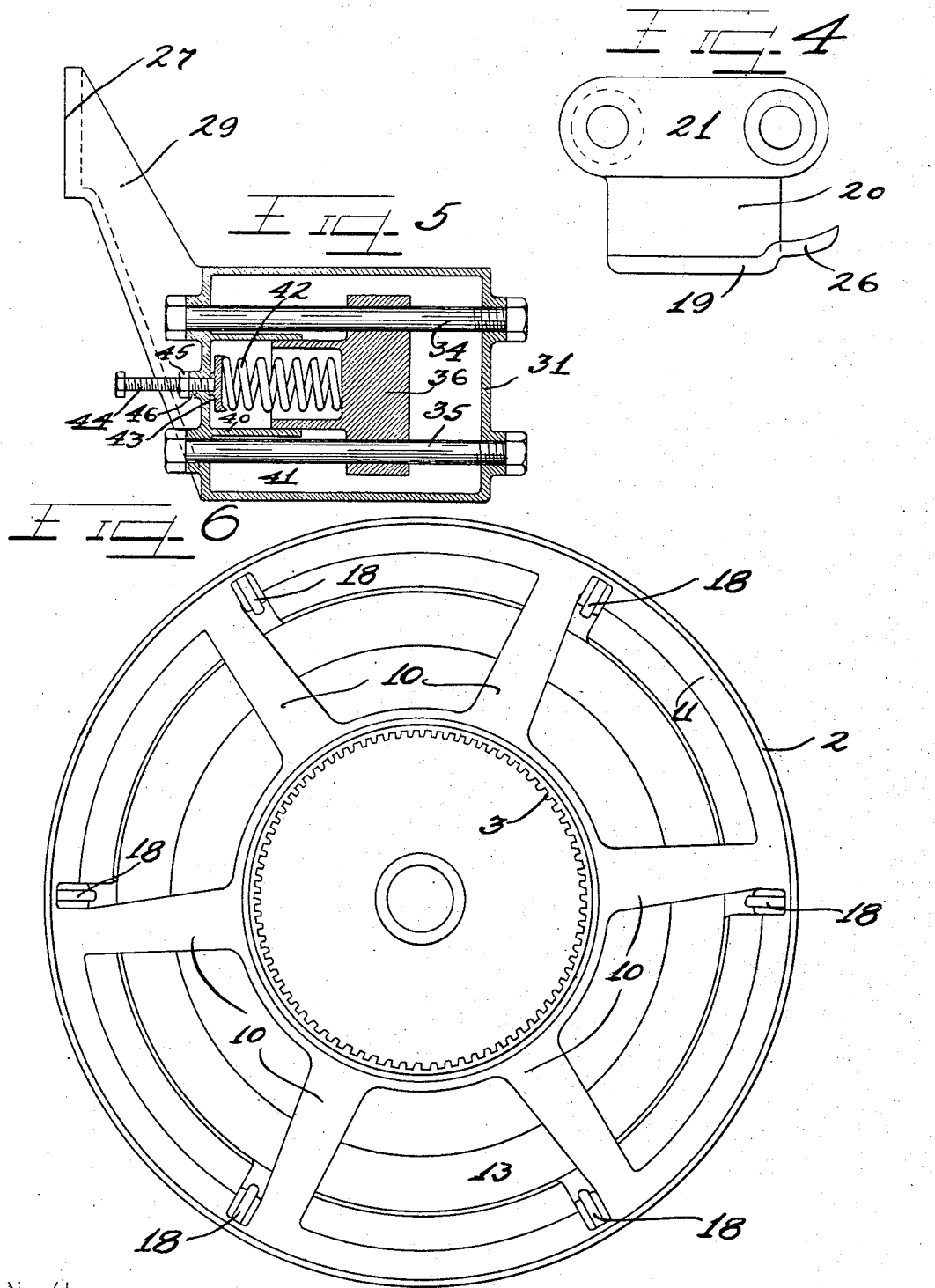

Patented Mar. 25, 1924.

1,487,751

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

CRAWLER-TYPE TRACK-LAYING TREAD ATTACHMENT FOR AUTOMOTIVE VEHICLES.

Application filed April 11, 1921. Serial No. 460,250.

*To all whom it may concern:*

Be it known that I, ROYAL R. MILLER, a citizen of the United States, and a resident of the city of Chicago, in the county of Cook and State of Illinois, have invented certain new and useful Improvements in a Crawler-Type Track-Laying Tread Attachment for Automotive Vehicles; and I do hereby declare that the following is a full, clear, and exact description of the same, reference being had to the accompanying drawings, and to the numerals of reference marked thereon, which form a part of this specification.

This invention relates to a crawler type track-laying tread attachment for automotive vehicles, and particularly to an attachment which may be used to convert existing types of round wheel tractors into crawler type tractors which are adapted to travel over unstable surfaces, such as sandy or muddy ground, with a minimum loss of tractive efficiency.

Crawler type driving mechanisms which are frequently used in order to obtain high tractive efficiency in traveling over soft ground have proven undesirable for use under more favorable conditions on account of the speed reduction necessitated by the use thereof and on account of the rapid wearing of the parts of the mechanisms constituting the same when in continual use.

Round drive wheels are, on account of the foregoing disadvantages, quite generally used, but it is apparent that the exclusive use of either the round drive wheel or of the crawler type driving mechanism limits the uses for which the tractor may be employed.

It is accordingly desirable that means be provided whereby a standard, annular drive wheel may be conveniently changed to a driving mechanism of the crawler type.

An object therefore of the present invention consists in the provision of a mechanism whereby an annular drive wheel may be conveniently converted into a crawler type driving mechanism.

It is another object of this invention to provide an attachment whereby a two-wheel tractor may be converted into a tractor of the crawler type.

It is a further object of this invention to provide an improved crawler type driving mechanism.

It is also an object of this invention to provide a crawler type driving mechanism having adjustable resilient means for tensioning the tread.

It is an important object of this invention to provide a crawler type driving mechanism which may be used on existing types of automotive vehicles without altering the construction thereof.

Other and further important objects of this invention will be apparent from the disclosures in the specification and the accompanying drawings.

The invention (in a preferred form) is shown on the drawings and hereinafter more fully described.

On the drawings:

Figure 3 is a front elevation of the tractor showing parts in section along the lines 3—3 and 4—4 of Figure 1.

Figure 4 is a side elevation of one of the tread elements.

Figure 5 is an enlarged detail section of the tension adjusting mechanism.

Figure 6 is an elevation of the inside of the tractor wheel showing the method of attaching the driving gear thereto.

As shown on the drawings:

The crawler type driving attachment of this invention is particularly adapted to be used on a tractor of the familiar two-wheel type, and for purposes of illustration is shown herein in this connection.

Figure 1:
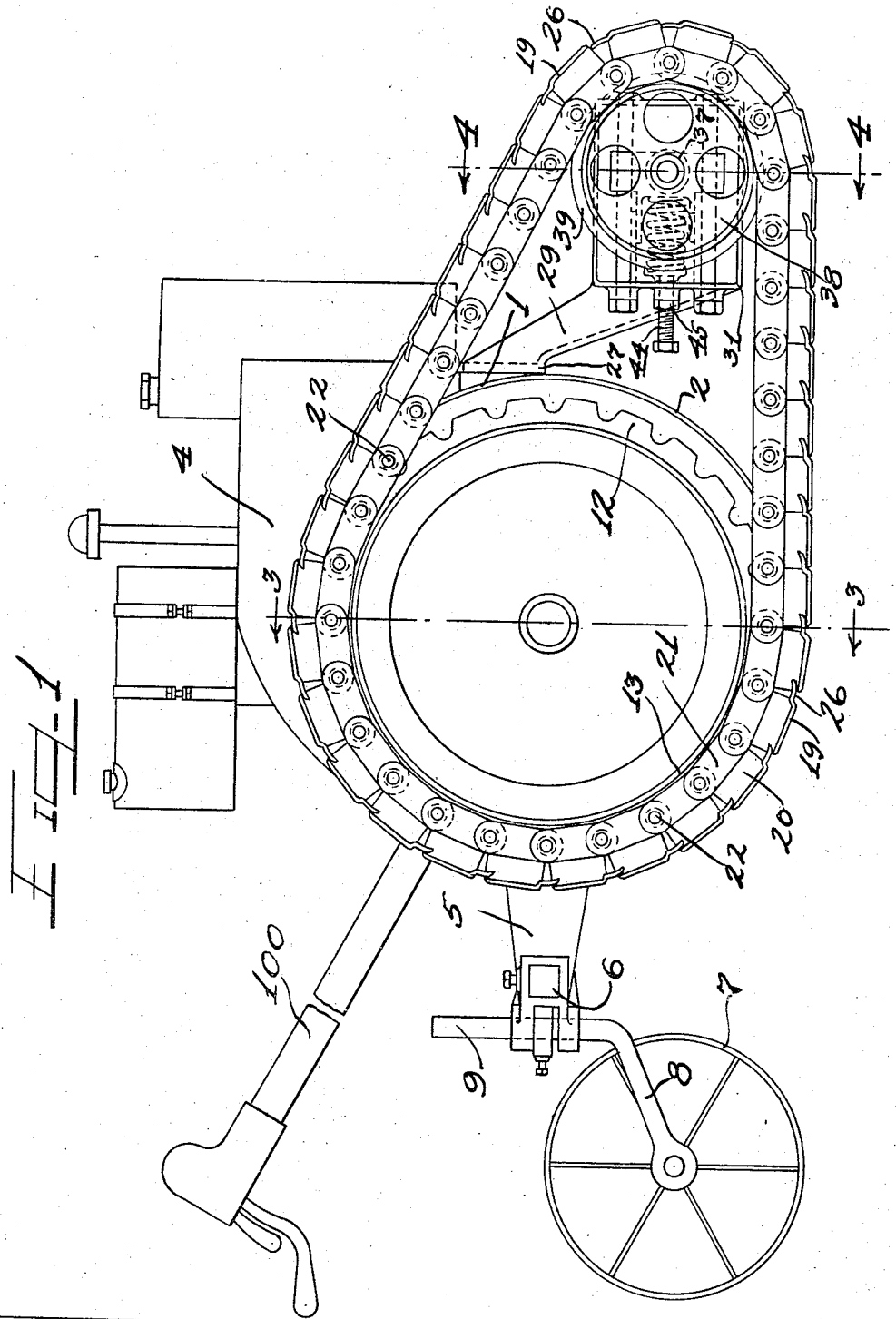
Figure 1 is a side elevation of a two-wheel tractor equipped with the improved converter mechanism of this invention.

Said tractor ordinarily comprises a chassis or frame 1, on which two drive wheels 2 are pivotally mounted, and said drive wheels are ordinarily driven through internal gears 3 by a suitable transmission which receives power from a power plant 4 mounted on the chassis 1 between the wheels 2. As shown in Figure 1, a rearward extension 5 is usually provided on the chassis 1 and said extension is provided with a connecting means 6 whereby the tractor may be connected to an implement to be operated thereby. When the tractor is not connected to implements the same is ordinarily balanced by means of a wheel 7 which is mounted on a bracket 8 having a vertical portion 9 pivotally secured in said connecting means 6. The driving wheels 2 are provided with spokes 10 which extend from the outer rim thereof inwardly to the internal gear 3 and the outer ends of said spokes 10 are connected by an inwardly directed integral annular flange 11 inside the outer rim of the driving wheel. Steering and control of the tractor is effected through control handles 100.

Figure 2:
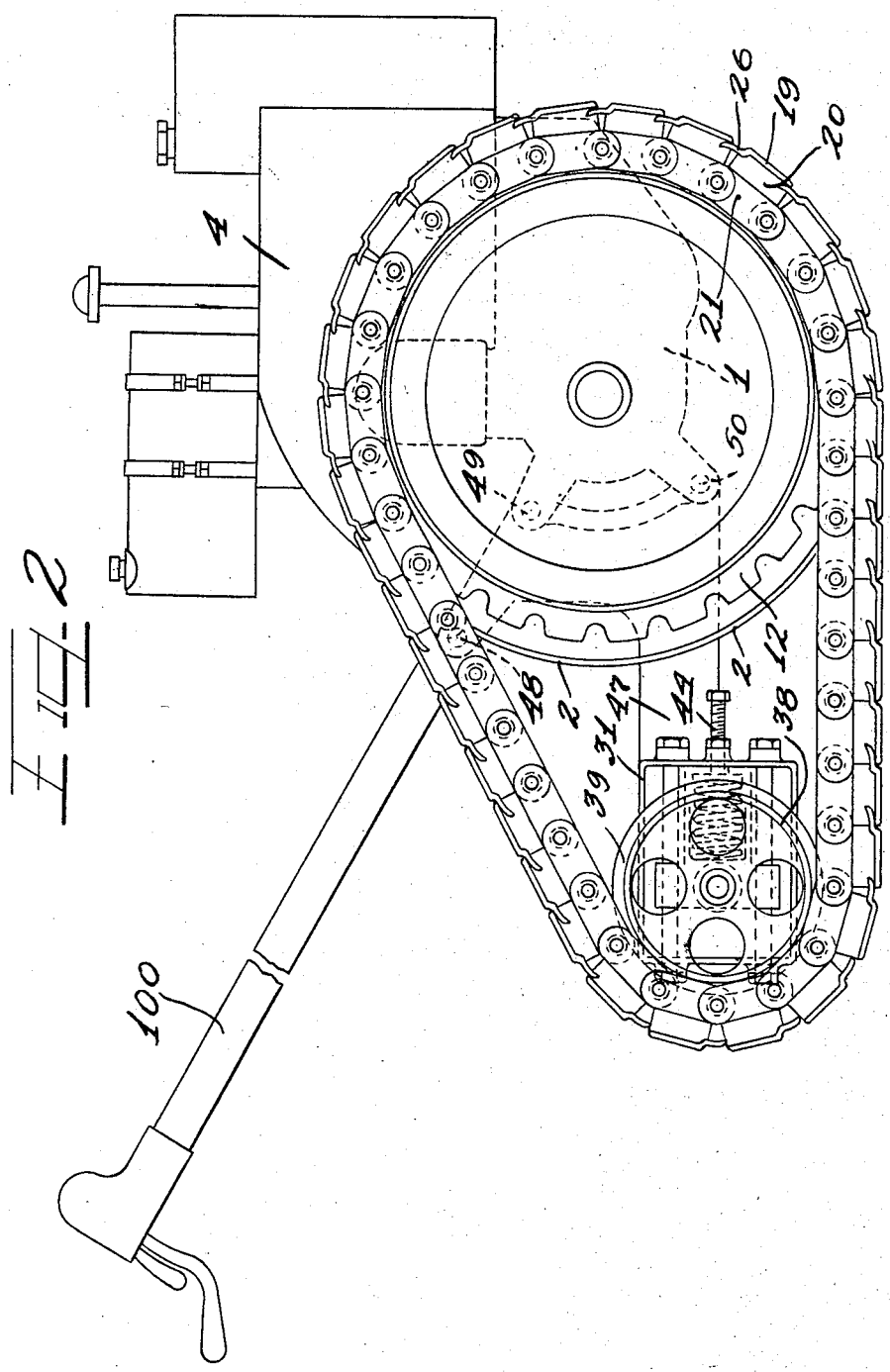
Figure 2 is a view similar to Figure 1 showing a different method of attaching the converter mechanism.

Power for driving the crawler type tread mechanism is transmitted thereto from the wheels 2 through gear teeth 12 which are mounted on an annular rim 13, as clearly shown in Figures 1, 2 and 3. Said rim 13 is provided with an inwardly extending integral annular flange 14 at its intermediate portion and on the inner edge of said rim is formed an outwardly extending integral annular flange 15. The outer edge of said flange 15 is cut away to afford a shoulder 16 which engages the outer edge and the inside surface of the rim of the wheel 2, as clearly shown in Figure 3. The flange 15 is provided with a plurality of apertures through which are engaged bolts 17 and said bolts 17 are engaged in threaded apertures in clevises or clamps 18 which engage the inner side of the flange 11 adjacent each of the spokes 10, as clearly shown in Figures 3 and 6. Consequently, tightening of the bolts 17 acts to draw the rim of the wheel 2 tightly against the shoulder 16 on the flange 15 and consequently the rim 13 and the gear 12 thereon may be firmly clamped to the wheel 2.

The crawler tread or track-laying tread comprises an endless chain or belt which consists of a plurality of pivotally connected tread members which are provided with means adapted to be engaged by the gear teeth 12 so that said tread members are driven thereby from the wheels 2. Said tread members each comprise a plate 19 which is provided with inwardly extending parallel plates 20 integral therewith and integrally formed on each of said plates 20 is a rib 21, the ends of said ribs being so spaced that the inside of the ribs on one tread element engage over the outside of the ribs on an adjacent tread element, as clearly shown in Figure 3. Said inter-engaging portions of the ribs 21 are provided with registering apertures and engaged through said apertures are pins or shafts 22 which act to connect the tread elements together and which are provided with rollers 23 mounted thereon between the plates 20, where they are adapted to be contacted by the gear teeth 12 as the wheel 2 rotates. Said shafts or pins 22 are adapted to be secured in position in the apertures in the ribs 21 by means of washers 24 and suitable cotter pins 25. In order that the tread elements may present a substantially continuous outer surface, each of the plates 19 is provided at one end with an inwardly extending integral portion 26 which is adapted to be engaged under the adjacent plate.

It will be observed from the foregoing that the tread elements are driven by the gear teeth 12 as the wheel 2 rotates, and as will be noted from an examination of Figure 3, the ribs 21 engage the rim 13 on either side of said gear teeth 12 and consequently said tread elements are supported on said rim.

In order that a large number of the plates 19 may engage the surface of the ground over which the tractor is traveling, it is necessary that the combined length of the connected tread elements be considerably in excess of the periphery of the rim 13, and it is also necessary that means be provided for properly tensioning said connected tread elements and for so positioning the same that a large area of tread surface is at all times maintained in contact with the surface over which the vehicle is traveling.

This tensioning and positioning mechanism which is shown particularly in Figures 1, 3 and 5, will now be described. Secured to the chassis or frame 1 by means of bolts 28 is a bracket 27, which is provided with arms 29 and 30 extending outwardly therefrom to positions in front of the wheels 2 and having supported thereon casings 31 and 32 respectively. Said casings 31 and 32 are braced by a rigid integral connecting member 33. Extending longitudinally of each of said casings 31 and 32 are bolts or guide rods 34 and 35, and slidably mounted on said guide rods is a casting 36 which has a spindle 37 extending laterally therefrom. Mounted on said spindle 37 is a wheel 38 around which the connected tread elements are engaged. Said wheel 38 is provided with a central peripheral rib 39 which is adapted to be engaged between the ribs 21 on the tread elements to maintain said tread elements in proper alignment with the wheel.

A mechanism is provided whereby the position of the casting 36 on the rods 34 and 35 may be adjusted to adjust the tension on the tread element and whereby said casting is resiliently held in this adjusted position in order that the strain on the tread elements and on the driving mechanisms which results from the same passing over uneven surfaces may be compensated for. For this purpose an inwardly extending axial sleeve 40 is integrally formed on each of said casings 31 and 32, and slidable inside of each of said sleeves 40 is a sleeve 41 which is integral with the casting 36. Inside said sleeve 41 and abutting the casting 36 is a coiled spring 42, the outer end of which abuts a plate 43 loosely mounted on the end of an adjusting bolt 44 engaged through a threaded aperture in the end of the casing. Engaged on said bolt 44 outside the casing is a lock nut 45 which is adapted to be turned down on an integral boss 46 on the casing to secure said bolt 44 in adjusted position.

In the construction shown in Figure 2 the casings 31 and 32 are supported on a bracket 47 which is secured to the rear end of the chassis or frame 1, at points 48, 49 and 50. With this construction, of course, the wheel 7 is ordinarily dispensed with.

The operation is as follows:

The attachment of this invention makes possible the convenient conversion of a round drive wheel vehicle into a vehicle having a crawler type tread and driving mechanism. When it is desired to effect this conversion it is only necessary to secure the toothed rim 13 to the drive wheels 2 by means of the clamps 18 and to secure the tread tensioning and guiding mechanisms to the front or rear of the tractor chassis or frame 1 by means of the brackets 27 or 47 respectively. After the gear driving means and the tensioning mechanism have been secured on the drive wheels the tread may be laid out on the ground and the vehicle driven thereon, after which the ends of the tread may be picked up and brought around over the gear teeth 12 and the guiding ribs 39 on the wheel 38. The ends of the tread may then be connected together by inserting a pin 22 through the apertures in the ribs 21 of the adjacent tread elements.

The conversion of the tractor into the crawler type makes possible the operation of the same over soft, sandy or muddy ground, and under conditions where it would be imposible to efficiently operate a tractor of the round drive wheel type. The interlocking extending plates 26 on the tread elements afford a construction whereby a substantially continuous tread surface is in contact with the surface over which the tractor is traveling, and on account of the large area of the tread surface the pressure exerted thereby for a unit area is very low and the tractive efficiency is correspondingly high. The provision of the resilient tensioning mechanism for the tread affords means whereby the danger of injury to the tread elements or the driving means therefor is minimized, since the compression of the coiled spring 42 acts to relieve the tension thereon. By the use of the mechanism of this invention it is possible to operate the tractor efficiently under unfavorable conditions and at the same time to have available a round wheel tractor which is best for operation under favorable conditions.

I am aware that numerous details of construction may be varied through a wide range without departing from the principles of this invention, and I therefore do not purpose limiting the patent granted otherwise than necessitated by the prior art.

I claim as my invention:

1. The combination with a motor vehicle and the wheels thereof, of driving gears mounted concentrically on said wheels, horizontal flanges on either said side of said driving gears, tread supporting mechanisms secured to the vehicle frame, and crawler type treads comprising a plurality of overlapping tread elements adapted to ride on said flanges and to be driven by said gears.

2. The combination with a motor vehicle and the wheels thereof, of driving gears mounted concentrically on said wheels, horizontal flanges on either said side of said driving gears, resiliently supported idling wheels having a central radial flange and horizontal flanges on either side thereof, and crawler type treads comprising a plurality of tread elements adapted to ride on said flanges and to be driven by said gears.

3. In a crawler type tread attachment for the drive wheels of automotive vehicles, a driving gear, concentric annular flange in connection therewith having faces adapted to engage with the outer edge and inside of the driving wheel rim, and means for removably securing said gear and flange to said drive wheels.

4. In a crawler type tread attachment for automotive vehicles, a driving sprocket adapted to be secured to the side of the vehicle driving wheel, a bracket adapted to be secured to the vehicle frame, parallel guide rods therein, a spindle carrying member slidably mounted on said guide rods, an idler wheel mounted on said spindle, a crawler type tread assembled around said driving sprocket and said idler wheel and resilient tensioning means coacting with said spindle carrying member to tension said tread.

In testimony whereof I have hereunto subscribed my name in the presence of two subscribing witnesses.

ROYAL R. MILLER.

Witnesses:
CARLTON HILL,
JAMES M. O'BRIEN.